US007917242B2

(12) United States Patent
Jones (10) Patent No.: US 7,917,242 B2
(45) Date of Patent: Mar. 29, 2011

(54) SYSTEM, METHOD, AND COMPUTER PROGRAM PRODUCT FOR COMPUTING JACK LOCATIONS TO ALIGN PARTS FOR ASSEMBLY

(75) Inventor: Alan K. Jones, Seattle, WA (US)

(73) Assignee: The Boeing Company, Chicago, IL (US)

( * ) Notice: Subject to any disclaimer, the term of this patent is extended or adjusted under 35 U.S.C. 154(b) by 752 days.

(21) Appl. No.: 11/977,987

(22) Filed: Oct. 26, 2007

(65) Prior Publication Data

US 2009/0112348 A1   Apr. 30, 2009

(51) Int. Cl.
*G06F 19/00* (2006.01)
*G05B 19/18* (2006.01)
(52) U.S. Cl. ............... 700/114; 700/57; 700/60; 700/62; 700/117; 29/281.4; 29/407.1
(58) Field of Classification Search .................... 700/97, 700/56, 57, 60–62, 117, 192–194, 114; 29/407.09, 29/466, 714, 281.4, 407.1; 269/37, 71, 900
See application file for complete search history.

(56) References Cited

U.S. PATENT DOCUMENTS

| 5,659,939 | A  | * | 8/1997  | Whitehouse ................. 29/281.4 |
| 6,230,382 | B1 | * | 5/2001  | Cunningham et al. ........ 29/407.1 |
| 7,614,154 | B2 |   | 11/2009 | Cobb |
| 2003/0090682 | A1 | * | 5/2003 | Gooch et al. ................... 356/620 |
| 2005/0172470 | A1 | * | 8/2005 | Cobb et al. .................... 29/407.1 |
| 2008/0172857 | A1 | * | 7/2008 | Brinkworth et al. ............ 29/559 |

* cited by examiner

*Primary Examiner* — Albert Decady
*Assistant Examiner* — Steven R Garland
(74) *Attorney, Agent, or Firm* — Toler Law Group (57) ABSTRACT

Illustrative computer-executable methods, systems, and computer software program products compute assembly jack locations to align parts for assembly. Initial locations of at least one component to be moved and a desired final location for the at least one component to be moved are determined from initial position measurement data for the at least one component to be moved and the final location. Motion to align the at least one component to be moved with the final location is automatically determined. Optimal displacements of assembly jacks to produce the determined motion are automatically determined. After movement, location of the at least one moved part at a final assembled position is automatically determined. If applicable, data regarding additional assembly jack displacement can be inputted, the determined optimal location for the at least one part to be moved can be adjusted, and additional motion due to additional assembly jack displacement can be determined.

20 Claims, 10 Drawing Sheets

| | Jack Name | A/P Coord X | A/P Coord Y | A/P Coord Z | | Jack Name | X Axis Delta Nom | Y Axis Delta Nom | Z Axis Delta Nom | | Jack Name | X Axis Delta Nom | Y Axis Delta Nom | Z Axis Delta Nom | Error code |
|---|---|---|---|---|---|---|---|---|---|---|---|---|---|---|---|
| 2 | FLF | 0.000 | -50.000 | 0.000 | | FLF | 0.000 | 0.000 | 0.000 | | FLF | 0.000 | 0.000 | 0.000 | 0 |
| 3 | FRF | 0.000 | 50.000 | 0.000 | | FRF | 0.000 | 0.000 | 0.000 | | FRF | 0.000 | 0.000 | 0.000 | |
| 4 | FLR | 100.000 | -50.000 | 0.000 | | FLR | 0.000 | 0.000 | 0.000 | | FLR | 0.000 | 0.000 | 0.000 | |
| 5 | FRR | 100.000 | 50.000 | 0.000 | | FRR | 0.000 | 0.000 | 0.000 | | FRR | 0.000 | 0.000 | 0.000 | |
| 7 | ALF | 1000.000 | -50.000 | 0.000 | | ALF | 0.000 | 0.000 | 0.000 | | ALF | -24.520 | -50.628 | 34.825 | 0 |
| 8 | ARF | 1000.000 | 50.000 | 0.000 | | ARF | 0.000 | 0.000 | 0.000 | | ARF | -19.289 | -50.777 | 33.265 | |
| 9 | ALR | 1100.000 | -50.000 | 0.000 | | ALR | 0.000 | 0.000 | 0.000 | | ALR | -24.717 | -55.800 | 38.401 | |
| 10 | ARR | 1100.000 | 50.000 | 0.000 | | ARR | 0.000 | 0.000 | 0.000 | | ARR | -19.487 | -55.949 | 36.841 | |
| 12 | LWI | 500.000 | -500.000 | 3.000 | | LWI | 0.000 | 0.000 | 0.000 | | LWI | 0.000 | 0.000 | 0.000 | 0 |
| 13 | LWA | 600.000 | -500.000 | 6.000 | | LWA | 0.000 | 0.000 | 0.000 | | LWA | 0.000 | 0.000 | 0.000 | |
| 14 | LWO | 500.000 | -1000.000 | 3.000 | | LWO | 0.000 | 0.000 | 0.000 | | LWO | 0.000 | 0.000 | 0.000 | |
| 16 | RWI | 500.000 | 500.000 | 3.000 | | RWI | 0.000 | 0.000 | 0.000 | | RWI | 0.000 | 0.000 | 0.000 | 0 |
| 17 | RWA | 600.000 | 500.000 | 6.000 | | RWA | 0.000 | 0.000 | 0.000 | | RWA | 0.000 | 0.000 | 0.000 | |
| 18 | RWO | 500.000 | 1000.000 | 3.000 | | RWO | 0.000 | 0.000 | 0.000 | | RWO | 0.000 | 0.000 | 0.000 | |

NOMINAL JACK VALUES — ACTUAL JACK DELTA FROM NOMINAL AT MEASUREMENT ACQUISITION — CALCULATED JACK DELTAS TO NOMINAL WITH MAJOR ASSEMBLIES ALIGNED PER INDEXING

Section Angles

| item | Sec 41 | Sec 43 | Sec 46 | Sec 47 | Lft SOB | Lft Wing | Rgt SOB | Rgt Wing |
|---|---|---|---|---|---|---|---|---|
| x | 0.000 | 0.000 | 0.000 | 20.000 | 0.000 | 0.000 | 0.000 | 0.000 |
| y | 0.000 | 0.000 | 0.000 | 0.000 | 0.000 | 0.000 | 0.000 | 0.000 |
| x | 0.000 | 0.000 | 0.000 | 1.000 | 0.000 | 0.000 | 0.000 | 0.000 |
| u | 0.000 | 0.000 | 0.000 | 1.000 | 0.000 | 0.000 | 0.000 | 0.000 |
| v | 0.000 | 0.000 | 0.000 | 2.000 | 0.000 | 0.000 | 0.000 | 0.000 |
| w | 0.000 | 0.000 | 0.000 | 3.000 | 0.000 | 0.000 | 0.000 | 0.000 |

Inputs from Pnt_cloud spreadsheet

FIG. 4C

SYSTEM, METHOD, AND COMPUTER PROGRAM PRODUCT FOR COMPUTING JACK LOCATIONS TO ALIGN PARTS FOR ASSEMBLY

BACKGROUND

Final assembly of a large-scale structure, such as a vehicle like aircraft or the like, typically is performed in an assembly area of a fabrication facility such as a factory. During final assembly of a large-scale structure, components (which may be large-scale components such as fuselage sections, wings, or the like) are placed on assembly jacks, located and aligned, and moved on the assembly jacks to be joined to each other.

However, prediction of assembly jack motions typically is done on an ad-hoc basis. This is because assembly jack motion prediction software has not been developed together with the corresponding assembly simulation software used to design the structure and its components. As a result, the structure as-built in the factory may or may not agree with assembly simulations on which the manufacturing plan is based. Furthermore, the exact final locations of components in the as-built structure are typically found by a separate measurement survey of the structure after assembly.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be illustrative, not limiting in scope. In various embodiments, one or more of the problems described above in the Background have been reduced or eliminated, while other embodiments are directed to other improvements.

In non-limiting, illustrative embodiments computer-executable methods, systems, and computer software program products are provided for computing assembly jack locations to align parts-for assembly. Initial locations of at least one component to be moved and a desired final location for the at least one component to be moved are determined from initial position measurement data for the at least one component to be moved and the final location. Motion to align the at least one component to be moved with the final location is automatically determined. Optimal displacements of assembly jacks to produce the determined motion are automatically determined. After the at least one part has been moved, location of the at least one moved part at a final assembled position is automatically determined.

According to an aspect, when additional assembly jack displacements have been made, such as by assembly mechanics, data regarding additional assembly jack displacement can be inputted, the determined optimal location for the at least one part to be moved can be adjusted, and additional motion due to additional assembly jack displacement can be determined.

According to other aspects, motion to align the at least one component to be moved with the final location can be determined by determining a rigid motion which aligns a first reference frame determined by a plurality of points of the at least one component to be moved with a second reference frame determined by a plurality of points of the final location. Moreover, the optimal displacements of assembly jacks can be determined by applying the determined rigid motion to initial assembly jack positions at a time of measurement before moving the at least one part to be moved. Further, the location of the at least one moved part at a final assembled position can be determined by subtracting the initial assembly jack positions from jack positions at the final assembled positions.

In addition to the illustrative embodiments and aspects described above, further embodiments and aspects will become apparent by reference to the drawings and by study of the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIGS. 4A-4C are screen shots of an illustrative, non-limiting implementation of computing assembly jack locations to align parts for assembly.

DETAILED DESCRIPTION

By way of overview, in some non-limiting, illustrative embodiments, assembly jack locations are computed to align parts for assembly. Initial locations of at least one component to be moved and a desired final location for the at least one component to be moved are determined from initial position measurement data for the at least one component to be moved and the final location. Motion to align the at least one component to be moved with the final location is automatically determined. Optimal displacements of assembly jacks to produce the determined motion are automatically determined. After the at least one part has been moved, location of the at least one moved part at a final assembled position is automatically determined.

Some definitions of terms used herein will first be set forth. As used herein: (i) the term "part" or "component" means "part or subassembly"; (ii) the term "location" means "position and orientation in space"; (iii) the term "motion" means "change of location" and does not intend to specify any speeds, accelerations, or other dynamic behavior, although other embodiments could compute and control such behavior; (iv) all measurements, unless otherwise stated, are made with respect to a fixed coordinate system that has been established on a factory floor; (v) an "assembly interface" of a part means one or more features that together determine how that part is to be mated to another part; (vi) an "assembly operation" means alignment of two parts (that is, a part to be moved and a stationary part) in accordance with a relevant index plan such that they may be joined together; and (vii) for each such assembly operation, it is assumed herein that the stationary part remains fixed with respect to a factory floor coordinate system and the part to be moved is moved by means of a system of powered assembly jacks into alignment with the stationary part. Moreover, the desired final location of the part to be moved is defined by a measurable position and orientation. The measurable position and orientation may include, for example and without limitation: fixed coordinates and directions in a GPS coordinate system; fixed monuments on a factory floor; or a stationary component of the desired structure to be assembled which is already located in its final position and into which the movable part is aligned and moved (and hence defines the desired final location of the part to be moved). For purposes of illustration only and without any limitation whatsoever, this desired final location will be referred to herein and shown in the drawings as a stationary component of the structure to be assembled.

The parts or components that are aligned with each other are components of a structure. In some embodiments, the structure may be a commercial aircraft. In such a non-limiting embodiment, the components can be fuselage sections, wings, and the like. However, it will be appreciated that the structure is not intended to be limited to commercial aircraft. The structure can also be other kind of aircraft, such as without limitation any kind of civilian or military aircraft or spacecraft. Moreover, the structure is not intended to the limited to aircraft or spacecraft. For example, the structure can be other types of vehicles, such as land vehicles like automobiles, trucks, recreational vehicles, and the like, and maritime vessels such as ships and submarines. Moreover, the structure could also be stationary structures, such as buildings of any type. Thus, the structure is not intended to be limited. To that end, the structure can be any kind of structure that entails accurate assembly of components.

Figure 1A:
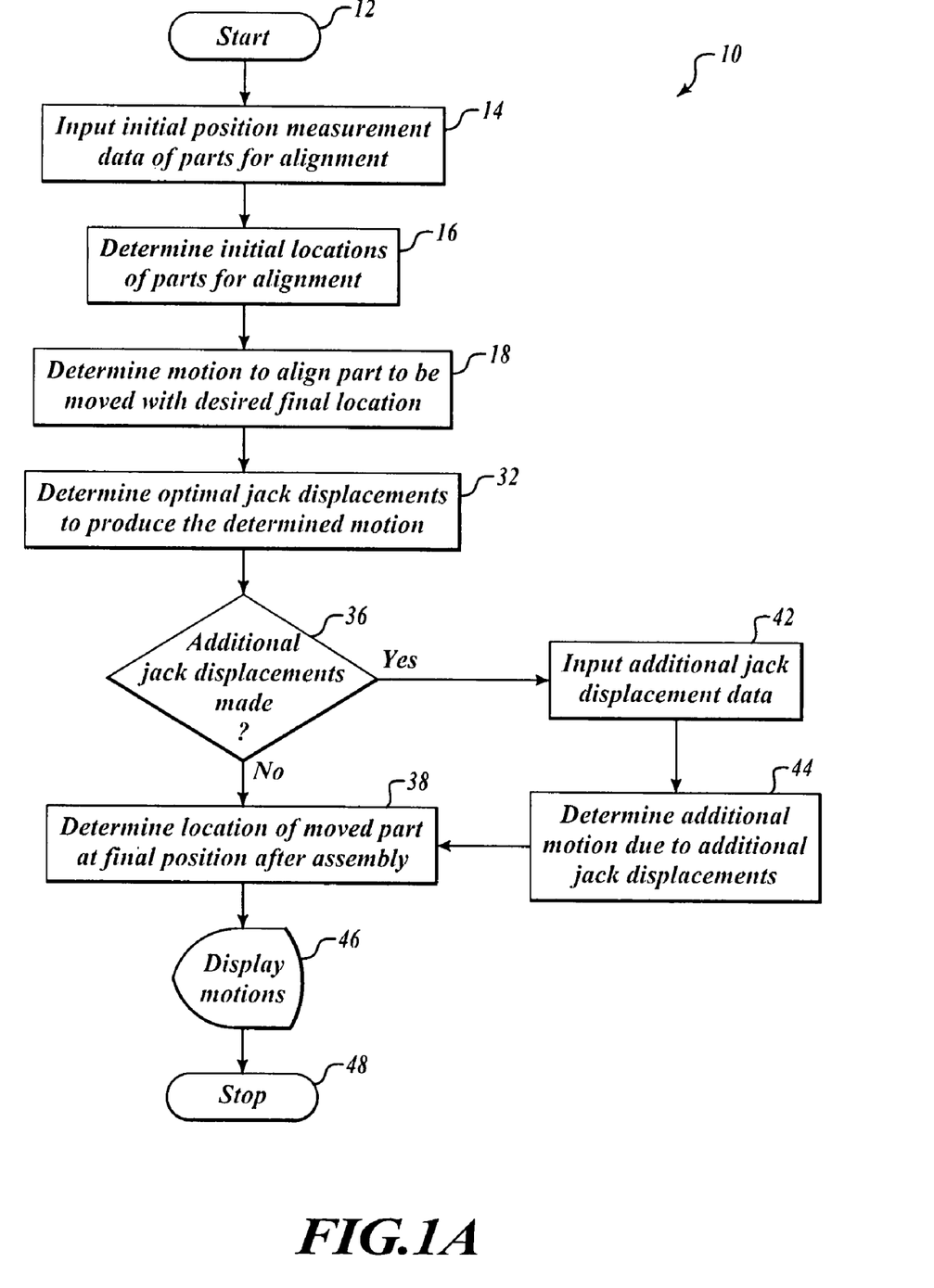
FIGS. 1A-1E are flowcharts of an illustrative method for computing assembly jack locations to align parts for assembly.

Referring now to FIG. 1A, a method 10 for computing assembly jack locations to align parts for assembly begins at a block 12. The method 10 suitably is a computer-executable method that uses measured locations of parts to compute assembly jack locations to align those parts for assembly into a structure. It is once again emphasized that the desired final location of the part to be moved is defined by a measurable position and orientation. The measurable position and orientation may include, for example and without limitation: fixed coordinates and directions in a GPS coordinate system; fixed monuments on a factory floor; or a stationary component of the desired structure to be assembled which is already located in its final position and into which the movable part is aligned and moved (and hence defines the desired final location of the part to be moved). For purposes of illustration only and without any limitation whatsoever, this desired final location will be referred to herein and shown in the drawings as a stationary component of the structure to be assembled.

At a block 14 measured initial positions of parts for alignment are input into suitable computer processing components (discussed further below). The initial positions that are measured suitably are locations of known reference points on assembly interfaces of at least one part to be moved and a stationary part (into which the movable parts are to be moved, thereby assembling the structure). The locations can be measured in any manner desired, such as without limitation in terms of azimuth and elevation and converted into coordinates in a coordinate system of the structure to be assembled.

The locations can be measured with any suitable measurement or metrology system whatsoever as desired for a particular application. For example and without limitation, the locations can be measured with a laser radar system, a laser tracker system, a photogrammetry system, an indoor global positioning system or infrared global positioning system, or the like. Given by way of example and not of limitation, a suitable system (that uses infrared global positioning system technology) for measuring locations of known reference points on assembly interfaces of at least one part to be moved and a stationary part (into which the movable parts are to be moved) is set forth in a concurrently-filed patent application Ser. No. 11/977,986, now issued at U.S. Pat. No. 7,614,154.

At a block 16 initial locations of the part(s) to be moved and the stationary part are determined from the initial position measurement data input at the block 14. As mentioned above, location entails components of position and orientation in space. At a block 18 motion to align the part(s) to be moved with the desired final location, such as the stationary part, is determined.

The concepts of location and motion as used herein are inter-related. As such, the following discussion explains both (i) determination of initial locations at the block 16 and (ii) determination of motion at the block 18.

In explaining location and motion, the following notational conventions are used herein: (i) 3×3 matrices are represented by bold face capital letters: A, B, C, etc.; (ii) 3D vectors are represented by bold face lower case letters: a, b, c, etc.; (iii) scalars (for example, angles) are in non-bold face lower case letters: a, b, c, etc., or by lower case Greek letters: $\alpha$, $\beta$, $\gamma$, etc.; and (iv) parts and features are represented by non-bold face capital letters: A, B, C, etc.

Within the above context, a rigid motion in space is a combination of rotation and translation in space. A mathematical rigid motion in this sense can be thought of either (i) as a physical change of location with respect to a fixed coordinate system or (ii) as a transformation between two different coordinate systems. Embodiments disclosed herein use the same representation for both.

The locations and motions used in the embodiments disclosed herein are not intended to be limited to rigid motions. The locations and motions could, for example, include elastic deformations. However, some measurement technology and assembly jack systems currently in use are not capable of dealing with elastic deformations. Therefore, for the sake of brevity, rigid motions will be discussed to explain the non-limiting, illustrative embodiments disclosed herein.

Representations of locations and motions in space involve matrices and angles. Mathematically, a rigid motion can be thought of as a combination of a 3×3 rotation matrix U and a 3-dimensional translation vector t. These are often combined into a single 4×4 matrix, which is mathematically equivalent to the form used herein. If the vector x represents the coordinates of a point before the motion and the vector x' represents the coordinates of the point after the motion, then $$x' = Ux + t. \tag{1}$$

where Ux represents matrix multiplication of the 3×3 matrix U and the 3×1 matrix (i.e., vector) x. In some contemplated manufacturing scenarios, both (i) an upstream variation simulation process (in which parts and structures are designed and in which trade studies are performed) and (ii) factory floor assembly processes use this representation of a rotation as a 3×3 matrix.

Figure 2A:
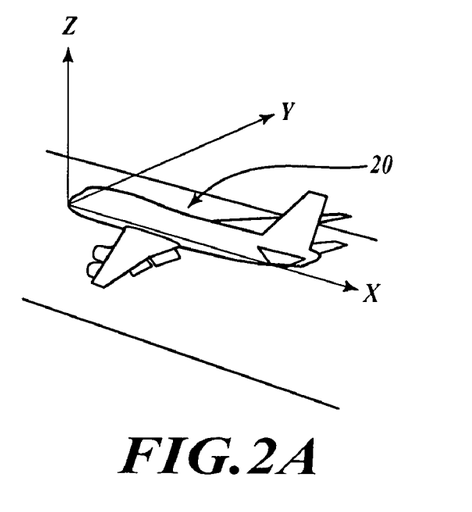
FIG. 2A illustrates an illustrative coordinate system.

Referring additionally to FIG. 2A, an illustrative system of Euler angles is used in some embodiments. An illustrative coordinate system of a structure 20 includes an X axis, a Y axis, and a Z axis. An illustrative system of Euler angles ($\theta$, $\phi$, $\psi$) is described as follows: rotate through angle $\theta$ about an X axis, then through angle $\phi$ about an original (that is, un-rotated) Y axis, then through angle $\psi$ about an original (that is, un-rotated) Z axis. The use of un-rotated axes for rotation is well adapted to a factory floor application. While an order in which the rotations are applied may be chosen arbitrarily, the same order is to be used consistently throughout the application. This consistency is entailed because different orders produce different results in 3-space (as will be discussed further below).

There is a mathematically exact transformation between Euler angles and rotation matrices except in a few special cases. For the particular scheme of Euler angles defined above, these special cases occur where $\cos \phi = 0$ when the mapping back from matrices to Euler angles becomes ambiguous. Thus, when angle $\phi = \pm 90°$ each choice of (p corresponds to a different choice of angle $\theta$. However, either choice of angle $\phi$ and angle $\theta$ leads back to the same rotation matrix. It will be noted, though, that angle $\phi = \pm 90°$ is not expected to occur for contemplated applications of disclosed embodiments.

Figure 2B:
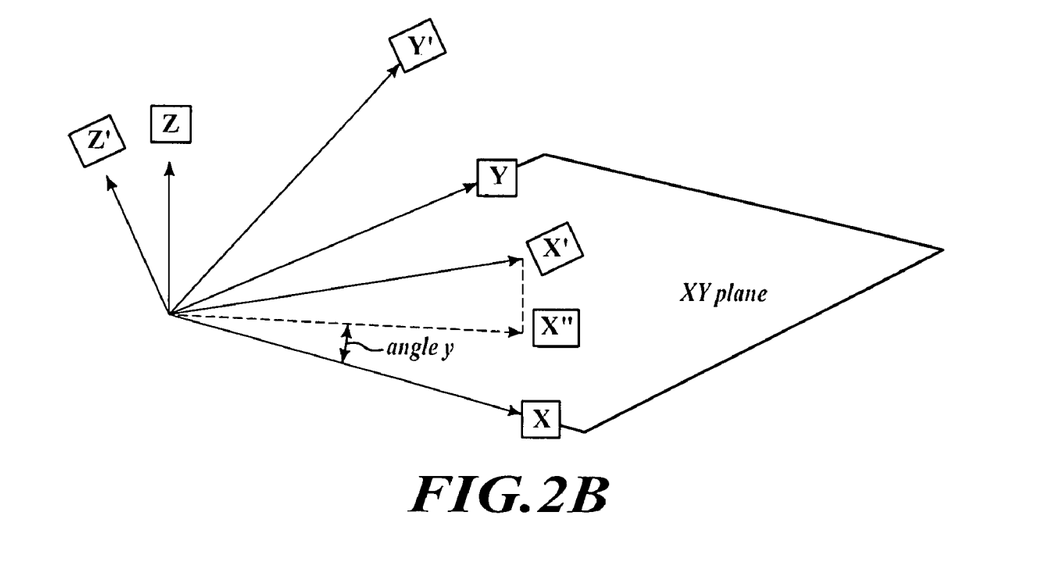
FIG. 2B illustrates planar projection angles.

Referring additionally now to FIG. 2B, for purposes of measuring rotations from a physical object and for predicting aerodynamic effects, Euler angles are not as appropriate as planar projection angles. Planar projection angles are defined procedurally as follows:

r=roll angle. Let Y"=the projection of the rotated Y' axis onto the un-rotated YZ plane. Then r is the angle between Y" and the un-rotated Y axis.

p=pitch angle. Let X"=the projection of the rotated X' axis onto the un-rotated XZ plane. Then p is the angle between X" and the un-rotated X axis.

y=yaw angle. Let X"=the projection of the rotated X' axis onto the un-rotated XY plane. Then y is the angle between X" and the un-rotated X axis.

These of planar projection angles are adapted to components of some structures that are assembled by some embodiments (for examples, structures such as aircraft and maritime vessels that have roll, pitch, and yaw axes). However, it will be appreciated that other similar definitions could be made for different applications.

There is a mathematically exact transformation between the planar projection angles (r, p, y) and the Euler angles ($\theta$, $\phi$, $\psi$), and hence to rotation matrices U, which is numerically stable as long as all of the angles have magnitude bounded below 90°. It will be noted that this is the case for contemplated applications of disclosed embodiments.

Because all planar projection angles are measured independently, there is no arbitrary choice of order involved. When all angles are small (such as on the order of 1° or less), the difference between planar projection angles andy the set of Euler angles used in disclosed embodiments is negligible. It will also be noted that this, too, is the case with all planar projection angles used in contemplated applications of disclosed embodiments.

Thus, determining motion at the block 18 entails an application of point registration that finds a rigid motion which relates the coordinate system defined by a set of nominal (as-designed) points $\{x_1, x_2, x_3, \ldots\}$ to a corresponding set of as-built points $\{y_1, y_2, y_3, \ldots\}$. The rigid motion can be found in two ways—a point cloud registration and a datum target registration. Whether a point cloud registration is used or a datum target registration is used in a particular case depends on the indexing plan for joining the parts in question.

The first registration method—the point cloud registration method—suitably is a best-fit method that is used when there is a number N>3 of measurement points, and the registration is to be based by "best fitting" all of them simultaneously. In one embodiment, the best fit could be, illustratively and without limitation, a least-squares fit. Mathematically, the least-squares point cloud registration method finds a rigid motion in the form x'=Ux+t such that the sum of squares of all the residuals is minimized over all possible matrix U and vector t. This operation suitably may be done by a standard method described in K. S. Arun, T. S. Huang, and S. D. Blostein; "Least Square Fitting of Two 3-D Point Sets"; *IEEE Transactions on PAMI*, 9(5):698-700, 1987. In some embodiments, if desired the mathematical software that does this computation may be the same software as that is used in the vendor software used for variation simulation by engineering personnel for component and structure design and trade studies.

The second registration method—the datum target registration method—is used when, instead of considering all the measurement points equally, a hierarchical structure is imposed. An example of such a method is the 3-2-1 method described as follows:

Define a primary coordinate plane X=0 to pass through points $x_1, x_2, x_3$.

Define a secondary coordinate plane Y=0 to pass through points $x_4$ and $x_5$, while being perpendicular to the primary.

Define a tertiary coordinate plane Z=0 to pass through the point $x_6$ while being perpendicular to both the primary and the secondary.

The mechanics of this procedure are defined by national and international standards, such as without limitation *Dimensioning and Tolerancing*, ASME Y14.5M-1994, American Society of Mechanical Engineers, New York, 1995. As with the point cloud registration method, if desired this procedure may be followed both in the disclosed embodiments and in the vendor software used for variation simulation by engineering personnel.

Determining the motion at the block 18 entails combining rigid motions. Before combining rigid motions is explained, combining rotations will first be explained. Combining two rotations is done by matrix multiplication. Thus, if the first rotation has matrix V and the second has matrix U, then the operation of performing the first rotation and then the second has matrix UV. The order matters, because with matrix multiplication in general UV≠VU. For example, referring back to FIG. 2A, rotating 90° about the X axis leaves the structure 20 (shown without limitation for illustration purposes as an aircraft) with its left wing pointed down but the nose pointed forward, and a further rotation of 90° about the Y axis points the nose straight up. However, starting with the rotation about Y points the nose up, and following with the rotation about X points the nose to the left. Reversing a rotation represented by the matrix U is done by taking the matrix inverse $U^{-1}$.

Combining rigid motions is similar to combining rotations, except that the translation vectors must also be combined. In disclosed embodiments, there are two basic scenarios that involve combining rigid motions: (i) motion to align two components; and (ii) orientation of an aerodynamically significant feature. Other applications are merely combinations of these scenarios.

Figure 1B:
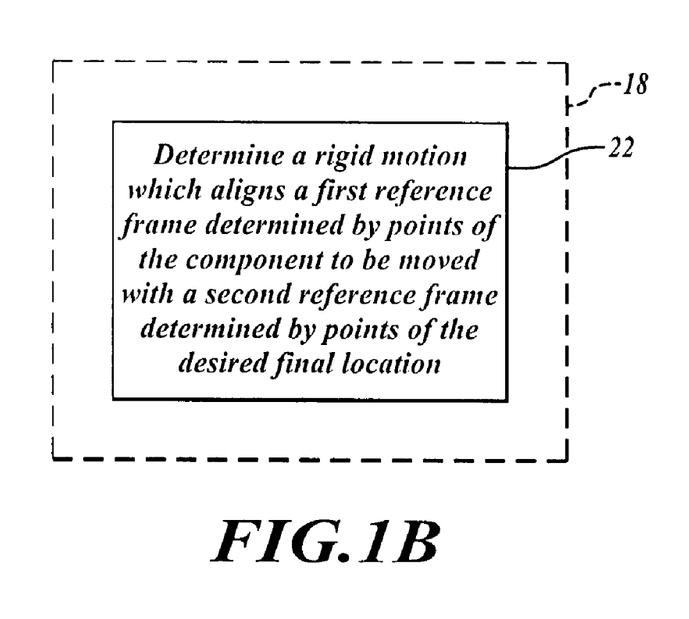
Figure 2C:
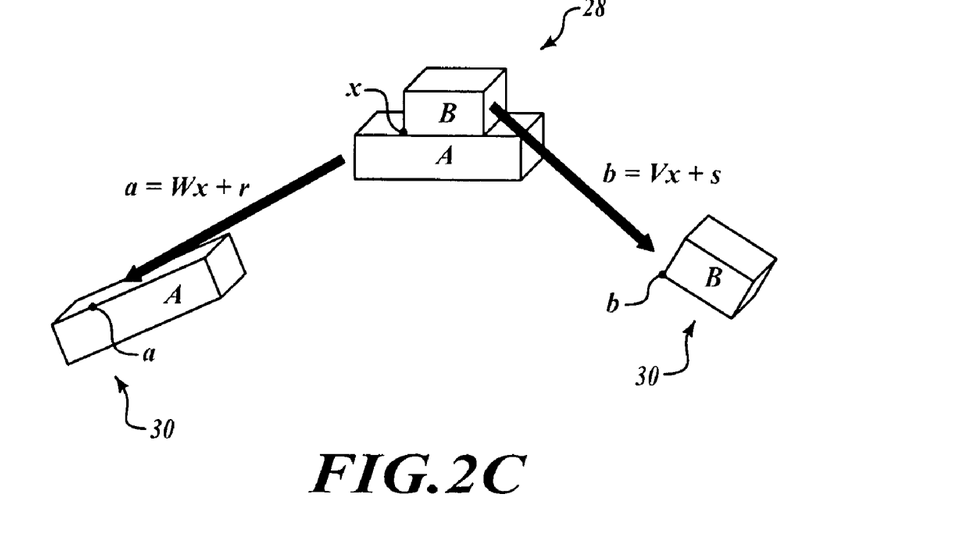
FIGS. 2C-2E illustrate computation of rigid motion to align a movable part with a final location.
Figure 2D:
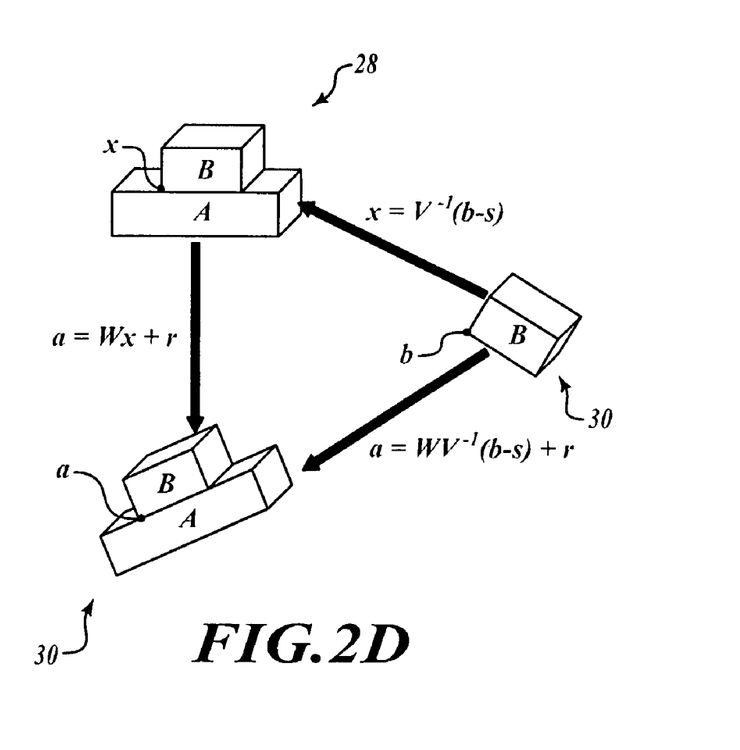

First, motion to align two components will be discussed. Referring now to FIGS. 1A and 1B, determining motion to align the part(s) to be moved with the desired final location, such as the stationary part, at the block 18 entails processing at a block 22, at which a rigid motion is determined which aligns a reference frame determined by points of the part(s) to be moved with a reference frame determined by points of the desired final location, such as the stationary component. Referring additionally to FIGS. 2C and 2D, given by way of non-limiting example component A is to remain fixed and component B is to move during a join. Let the nominal measurement points of A be $\{a_1, \ldots, a_N\}$ with corresponding measured points $\{a'_1, \ldots, a'_N\}$. Similarly, the nominal measurement points of B are $\{b_1, \ldots, b_M\}$ with corresponding measured points $\{b'_1, \ldots, b'_M\}$. There is no requirement for the nominal points on A to be the same as those on B, or even that N=M. At the block 22, a rigid motion a=Ub+t is computed which aligns the reference frame defined by the points $\{b'_1, \ldots, b'_M\}$ of B with the reference frame defined by the points $\{a'_1, \ldots, a!_N\}$ of A.

Figure 1C:
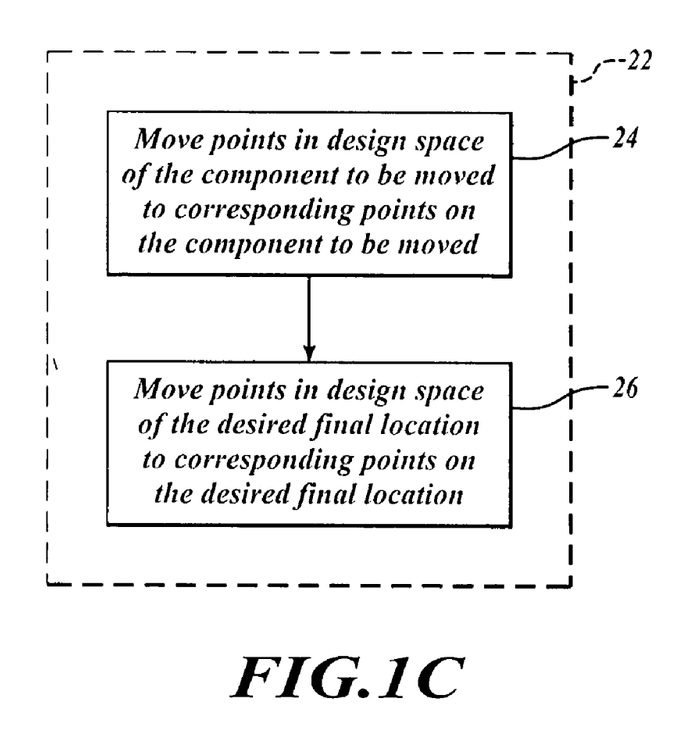

Referring additionally to FIG. 1C, in some embodiments determination of the rigid motion at the block 22 is performed in two stages. In the first stage, at a block 24 points in design space of the part(s) to be moved are moved to corresponding points on the part(s) to be moved and at a block 26 points in design space of the desired final location, such as the stationary part, are moved to corresponding points on the final location, such as the stationary part. As shown in FIG. 2C, the parts A and B are aligned in design space 28. At the block 24 a rigid motion b=Vx+s is found which moves every point x in design space 28 to its corresponding point b on the component B on a factory floor 30. Similarly, at the block 26 a rigid motion a=Wx+r is found that moves an arbitrary point x in design space 28 into its corresponding point a on the component A on the factory floor 30.

In the second stage, the motion a=Ub+t is determined. The equation b=Vx+s is solved for x, giving $x=V^{-1}(b-s)$, which is then substituted into the equation a=Wx+r to get $$a = WV^{-1}(b-s) + r = WV^{-1}b + r - WV^{-1}s = Ub + t \qquad (2)$$

where $U = WV^{-1}$, and $t = r - WV^{-1}s = r - Us$.

Thus, the rigid motion a=Ub+t can be applied to points on the part(s) to be moved (that is, the component(s) B) from their initial locations on the factory floor 30 (that was determined at the block 16 (FIG. 1A)) such that the part(s) B will be aligned with the stationary part A at the location of the stationary part A on the factory floor 30 (that was also determined at the block 16 (FIG. 1A)) in the same manner that they are aligned in design space 28.

Figure 2E:
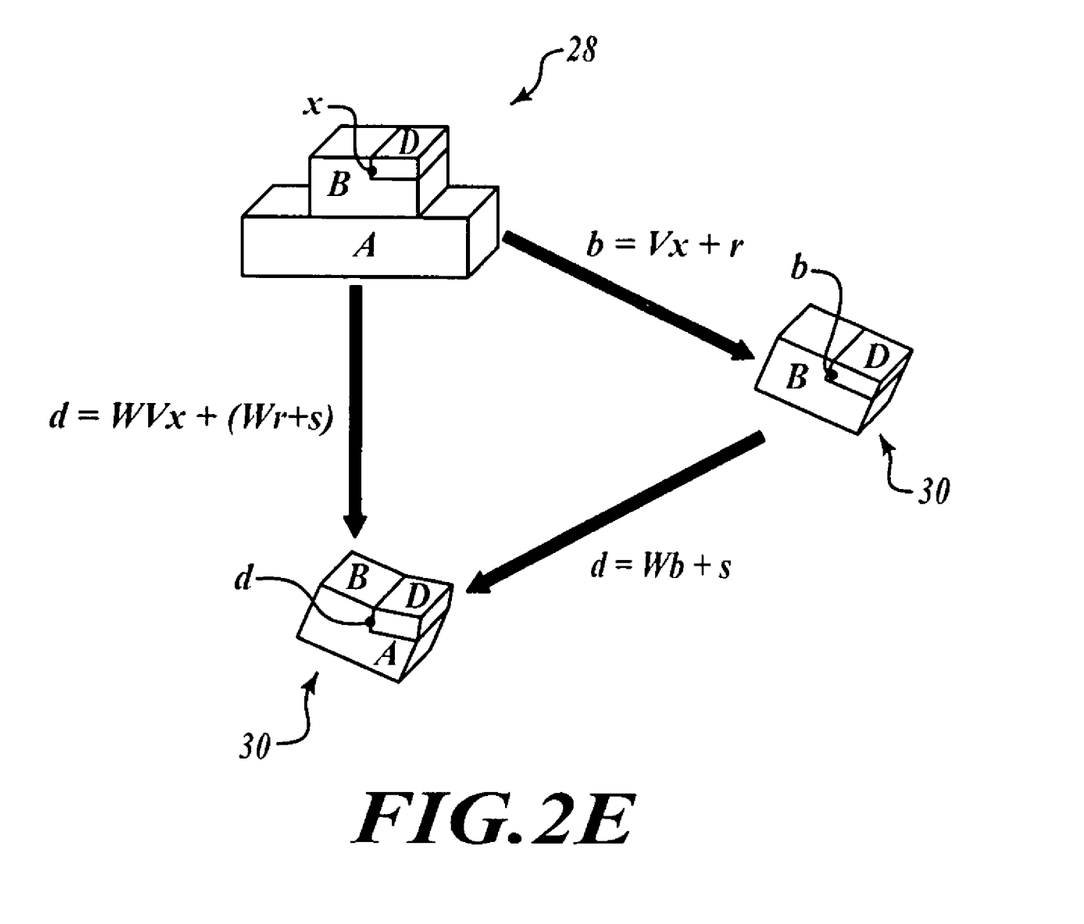

Referring additionally now to FIG. 2E, in some instances the component B may contain a feature D that is subject to manufacturing variation. That is, the feature D may not be in its nominal location with respect to the datum reference frame defined by the points $\{b_1, \ldots, b_M\}$. In such a case a motion d=Ux+t is found that carries the nominal location of any point x on the feature D to its actual location on the factory floor 30, Let b=Vx+s be a rigid motion that locates the reference points $\{b_1, \ldots, b_M\}$ on the factory floor 30, and let d=Wb+r be a rigid motion that locates the feature D with respect to the datum reference frame defined by the reference points $\{b_1, \ldots, b_M\}$. Then the transformation is given by $$d = Wb + r = W(Vx+s) + r = WVx + Ws + r = Ux + t \qquad (3)$$

where $U = WV$, $t = Ws + r$.

Figure 1D:
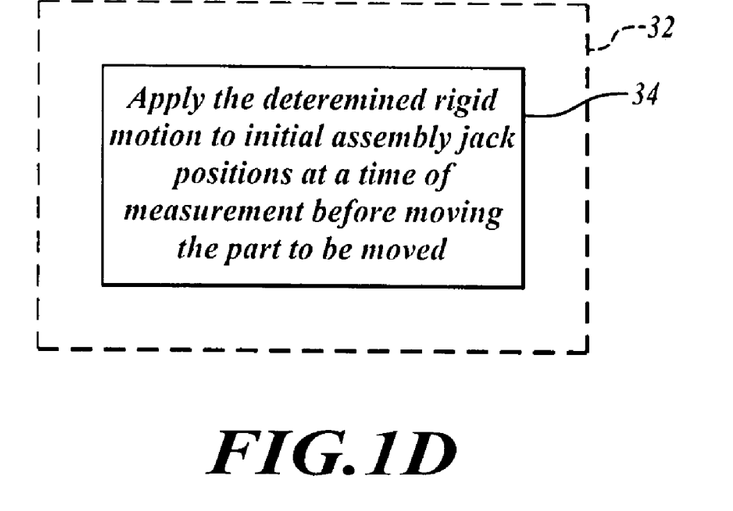

Referring back to FIG. 1A, after the rigid motion b'=Ub+t has been determined, at a block 32 optimal displacements of assembly jacks are determined that will produce the determined motion for the part(s) to be moved into alignment with the stationary part. The assembly jacks that support the part(s) to be moved and the stationary part have axes that desirably are aligned with axes of the coordinate system of the structure to be assembled (and therefore with the factory floor coordinate system in which the parts are measured). Referring additionally to FIG. 1D, determining the optimal assembly jack displacements entails processing at a block 34 at which the determined rigid motion is applied to initial assembly jack positions at a time of measurement before moving the part(s) to be moved. Thus, displacements of the assembly jacks (upon which the part(s) to be moved are supported) that were determined at the block 32 will result in the determined rigid motion to align the part(s) to be moved with the stationary part.

Referring back to FIG. 1A, at a decision block 36 a determination is made whether additional assembly jack displacements have been made after the part(s) has been moved on the assembly jacks into alignment with the desired final location, such as the stationary part. For example, additional assembly jack displacements may be made by assembly mechanics to adjust the actual location of the moved part(s) from the computed optimal location for the moved part(s) at the final set location in which the stationary part and the moved part(s) are fastened together.

Figure 1E:
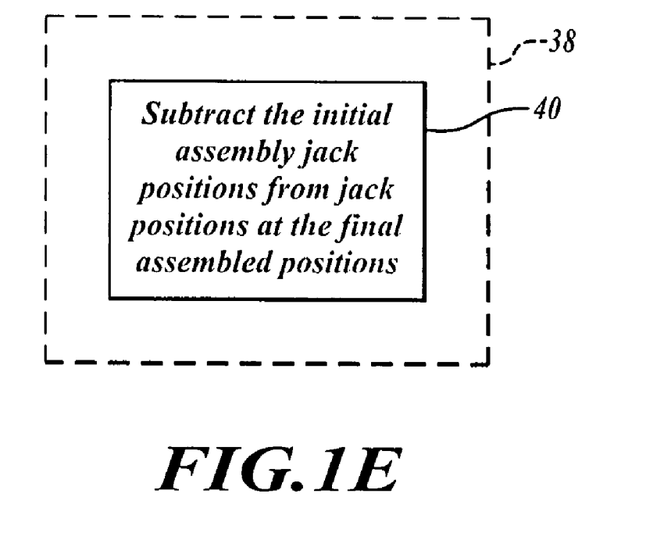

If no additional assembly jack displacements have been made, then at a block 38 the location of the moved part(s) at a final assembled position is determined. Referring additionally to FIG. 1E, determining the location of the moved part(s) at a final assembled position entails processing at a block 40 at which the initial assembly jack positions are subtracted from jack positions at the final assembled positions. If the axes of the jack system are not aligned with the axes of the common factory floor coordinate system, an additional rotational correction is applied to express the jack delta motions in terms of the jack axis directions.

If additional assembly jack displacements have been made, then at a block 42 additional data is input regarding additional assembly jack displacements made by assembly mechanics to adjust the actual location of the moved part(s) from the computed optimal location for the moved part(s) at the final set location. For example, assembly jack control processing can measure the difference between the pre-computed optimal jack locations and the locations at final set. At a block 44, additional motion due to additional assembly jack displacement is determined. For example, from the measured differences-between the pre-computed optimal jack locations and the locations at final set a rotation that represents the motion from initial set to final set can be determined. This rotation suitably is reported in the form of planar projection angles, as described above. The planar projection angles may be transformed to Euler angles, and then to 3×3 matrix form. However, because these delta angles typically will be small in contemplated applications of disclosed embodiments, the Euler angles (θ, φ, ψ) can be taken to be equal to the planar projection angles (r, p, y). Processing then proceeds to the block 38 as described above.

At a block 46 motions are displayed. Euler angles suitably are used to communicate information about rotations to assembly mechanics on the factory floor because Euler angles contain more easily interpreted information than a 3×3 matrix. Precision in these numbers is required only when the numbers become small, at which point the Euler angles are substantially the same as planar projection angles.

The method 10 stops at a block 48.

Figure 3:
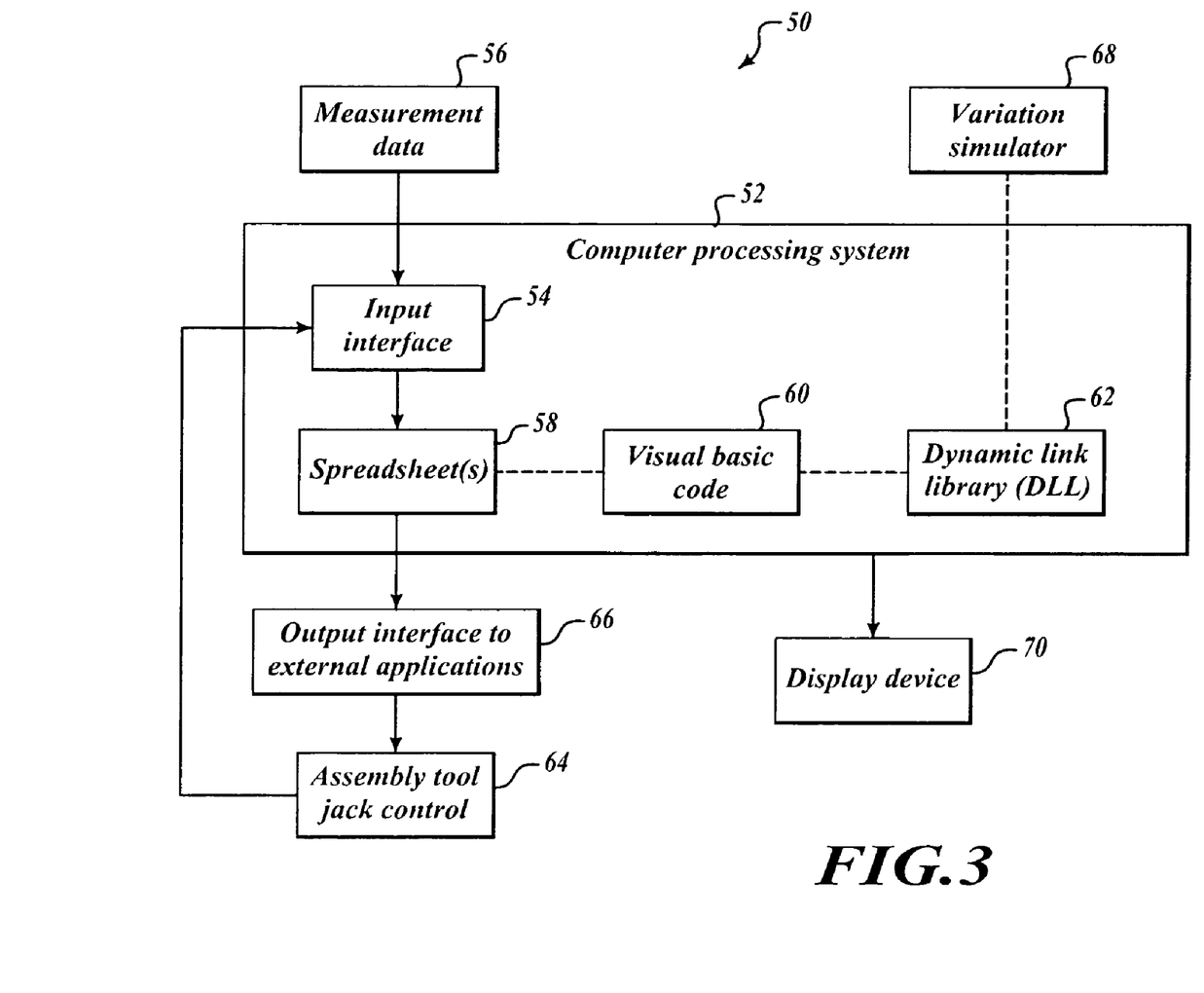
FIG. 3 is a block diagram of an illustrative system for computing assembly jack locations to align parts for assembly.

Referring now to FIG. 3, a system 50 is provided for computing assembly jack locations to align parts for assembly. A computer processing system 52 includes an input interface 54. Measurement data 56 regarding initial position of the parts for alignment is provided to the input interface 54.

In an illustrative embodiment, computer processing components of the computer processing system execute one or more spreadsheets 58, visual basic code 60, and routines from a dynamic link library 62. The spreadsheet 58 receives from the measurement system via the input interface 54 initial position measurement data from which the initial locations of the components. to be assembled can be determined. The spreadsheet 58 passes the resulting optimal assembly jack positions to external applications, such as without limitation an assembly jack control 64 or other external processes as desired, via an output interface 66. The spreadsheet 58 receives feedback from the jack assembly control 64 via the input interface 54 on the actual locations of the jacks at final set.

In some embodiments, the spreadsheet computations can be divided into several separate spreadsheets as desired for a particular purpose. However, in some other embodiments the spreadsheet computations can be performed by a single spreadsheet. For purposes of clarity, the one or more spreadsheets 58 are referred to herein as the spreadsheet 58.

To perform its calculations, in some embodiments the spreadsheet 58 performs computations that use a mixture of spreadsheet formulas, the visual basic code 60 written in the Visual Basic for Applications (VBA) computer language (which is embedded in the spreadsheet 58), and the dynamic link library (DLL) 62 containing complex numerical computations which are implemented in the C computer language. If desired, the C code in turn also can be used by an upstream variation simulation process in a variation simulator 68. The purpose of this is to simulate the assembly effects of variation in individual parts to perform variation management trade studies during the engineering design phase. The sharing of numerical algorithms and software between the engineering design and factory floor assembly stages enables the factory floor assembly process to be the same process that was simulated during engineering design studies.

A display device 70 is operatively coupled to the computer processing system 52 to display motions. As discussed above, Euler angles suitably are used to communicate information about rotations to assembly mechanics on the factory floor.

Figure 4B:
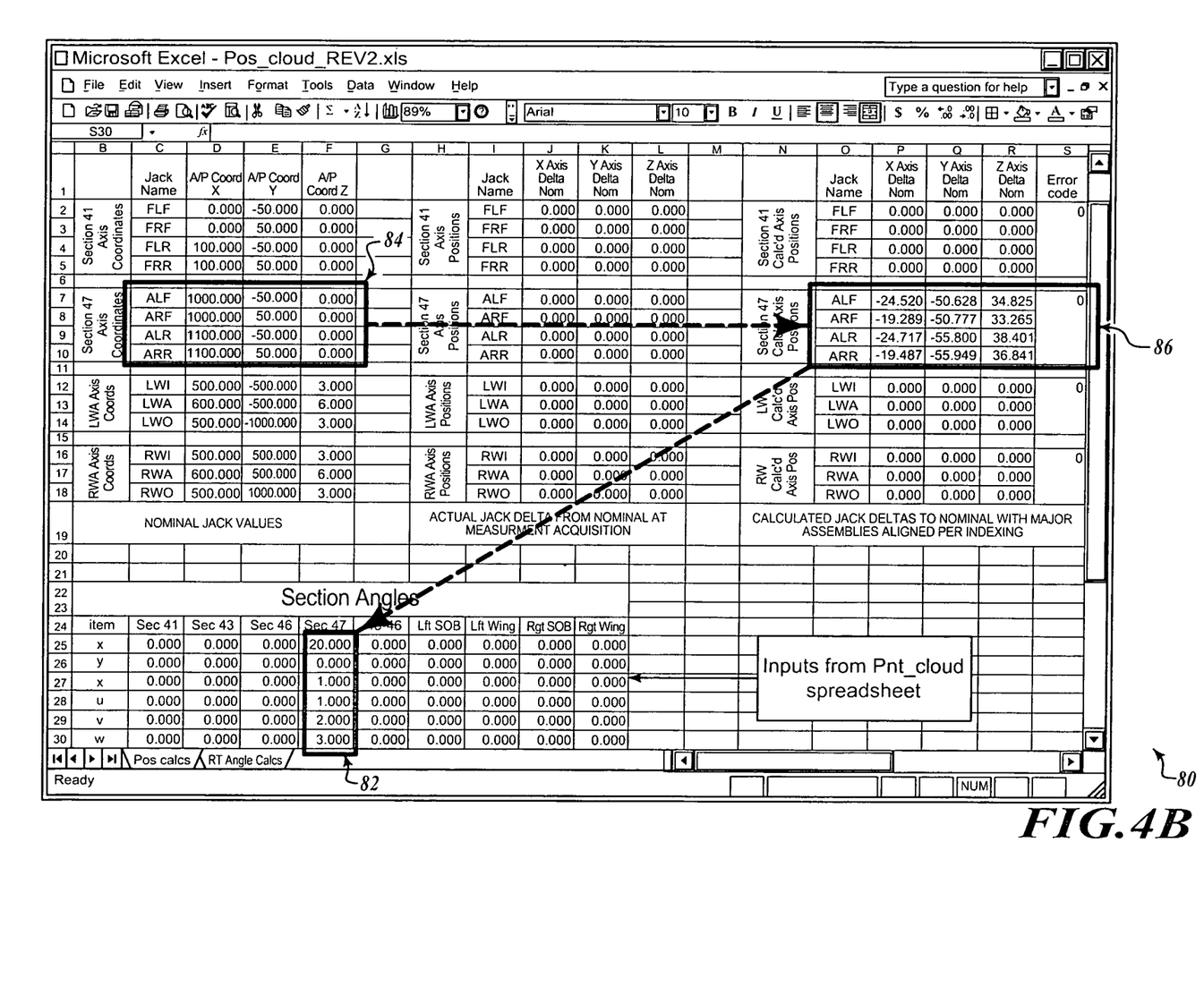
Figure 4C:
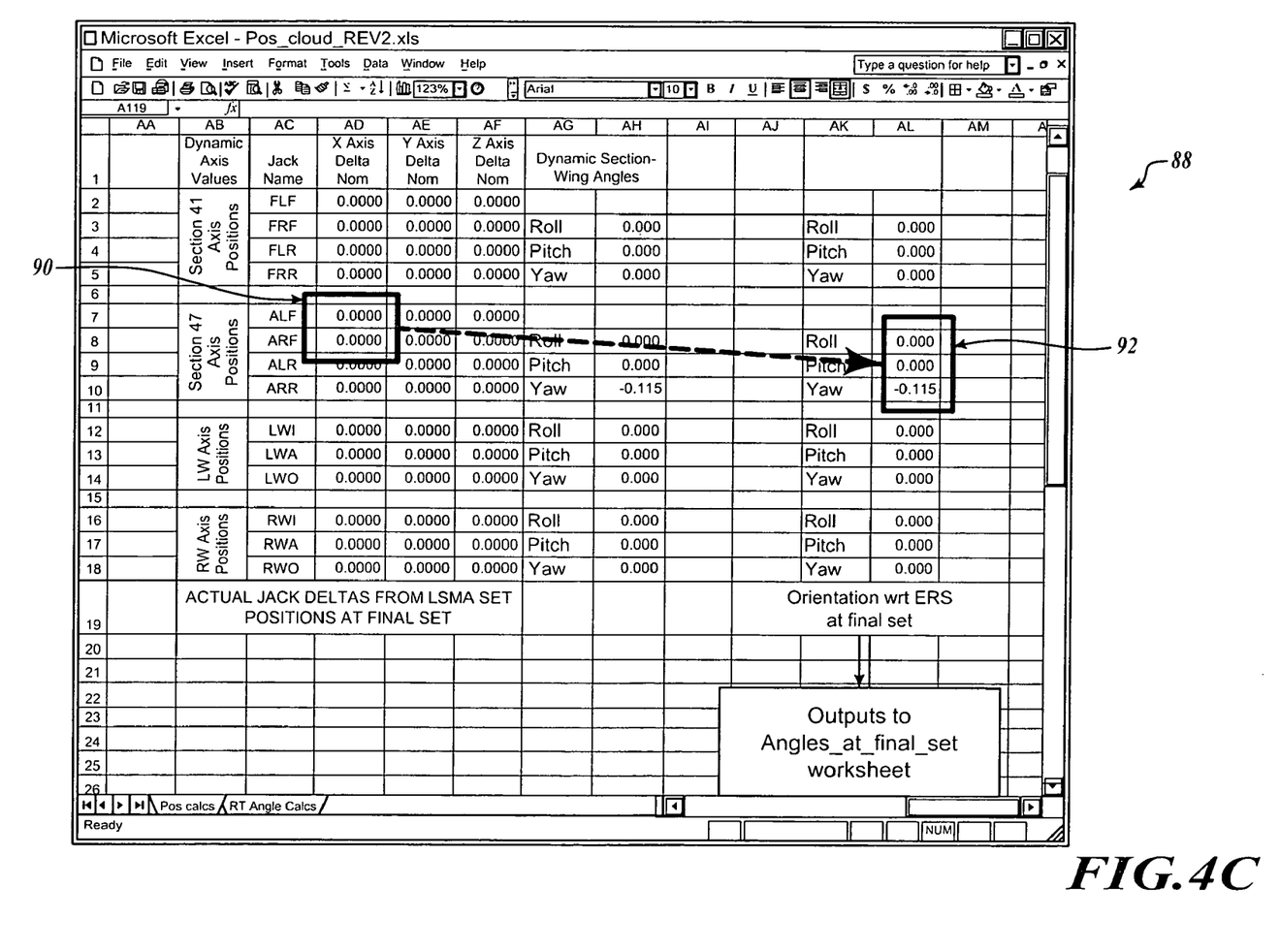

Referring now to FIGS. 4A-4C, illustrative screen shots show processing performed by the spreadsheet 58 (FIG. 3) in illustrative embodiments. Given by way of non-limiting example, the screen shots illustrate processing of data for assembling an aircraft from fuselage sections. For purposes of clarity, the screen shots illustrate a simplified assembly scenario in which (i) all major assemblies (that is, fuselage sections) are in their nominal positions on the factory floor except the rear-most section of the fuselage (section 47) and (ii) all key features are at nominal orientation relative to their respective major assemblies except the vertical fin (which is attached to section 47). It will be appreciated that all numerical data shown on the screenshots are notional, and bear no relation to actual product data.

Referring now to FIG. 4A, in a screen 72; cells 74 are populated with initial position measurement data 56 (FIG. 3) from the measurement system via the input interface 54 (FIG. 3) for ten target points on section 47, thereby executing processing of the block 14 (FIG. 1A). Data regarding nominal locations of the ten target points on section 47 are populated in cells 76. The measured data from the cells 74 and the nominal data from the cells 76 are combined to compute the initial location and orientation of section 47 with respect to the factory floor ERS coordinate system, thereby executing processing of the block 16 (FIG. 1A). Given by way of non-limiting example, the point cloud registration method was used to combine the measured data from the cells 74 and the nominal data from the cells 76 to compute the initial location and orientation of section 47 with respect to the factory floor ERS coordinate system. Resulting data for initial location and orientation of section 47 are populated in cells 78.

Referring now to FIG. 4B, in a screen 80 the data regarding location and orientation of section 47 from the cells 78 (FIG. 4A) are populated in cells 82. The data regarding location and orientation of section 47 from the cells 82 is combined with data in cells 84 regarding nominal assembly jack locations to produce desired assembly jack deltas (that is, displacements) to bring section 47 into alignment with the stationary fuselage section 46 (which is already in nominal location and alignment), thereby executing processing of the block 32 (FIG. 1A). These jack displacements bring section 47 into its optimal set position. Data regarding the jack displacements populate cells 86.

Referring now to FIG. 4C, in a screen 88 data regarding actual assembly jack deltas introduced by assembly mechanics in moving from the optimal set to final set populates cells 90, thereby executing processing of the blocks 42 and 44 (both FIG. 1A). The data from the cells 90 is used to compute section 47's orientation at final set, thereby executing processing of the block 38 (FIG. 1A). Resulting data regarding section 47's orientation at final set populates cells 92.

In various embodiments, portions of the system and method include a computer program product. The computer program product includes a computer-readable storage medium, such as a non-volatile storage medium, and computer-readable program code portions, such as a series of computer instructions, embodied in the computer-readable storage medium. Typically, the computer program is stored and executed by a processing unit or a related memory device, such as processing components of the computer processing system 52 depicted in FIG. 3.

In this regard, FIGS. 1A-1E, 3, and 4A-4C are flowcharts and control flow illustrations, block diagrams, and screen shots, respectively, of methods, systems, and program products, respectively, according to various embodiments. It will be understood that each block of the block diagram, flowchart and control flow illustrations, and combinations of blocks in the block diagram, and flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s).

Accordingly, blocks of the block diagram, flowchart or control flow illustrations support combinations of means for performing the specified functions, combinations of steps for performing the specified functions and program instruction means for performing the specified functions. It will also be understood that each block of the block diagram, flowchart or control flow illustrations, and combinations of blocks in the block diagram, flowchart or control flow illustrations, can be implemented by special purpose hardware-based computer systems which perform the specified functions or steps, or combinations of special purpose hardware and computer instructions.

While a number of illustrative embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A computer executable method for computing assembly jack locations to align parts for assembly, the method comprising:
automatically determining an initial location of at least one component to be moved and a final location for the at least one component to be moved using initial position measurement data for the at least one component to be moved and information specifying the final location;
automatically determining motion to align the at least one component to be moved with the final location;
automatically determining displacements of assembly jacks to produce the determined motion;
after the at least one component has been moved, receiving information indicating that a manual adjustment in addition to the determined displacements has been made to the assembly jacks; and
after the information is received, automatically determining a location of the at least one moved component at a final assembled position.

2. The method of claim 1, wherein determining motion to align the at least one component to be moved with the final location includes determining a rigid motion which aligns a first reference frame determined by a plurality of points of the at least one component to be moved with a second reference frame determined by a plurality of points of the final location.

3. The method of claim 2, wherein determining the rigid motion includes:
moving a plurality of points in design space of the at least one component to be moved to a plurality of corresponding points on the at least one component to be moved; and
moving a plurality of points in design space of the final location to a plurality of corresponding points on the final location.

4. The method of claim 2, wherein determining displacements of the assembly jacks includes applying the determined rigid motion to initial assembly jack positions at a time of measurement before moving the at least one component to be moved.

5. The method of claim 4, wherein determining the location of the at least one moved component at the final assembled position includes subtracting the initial assembly jack positions from jack positions after the manual adjustment has been made.

6. A system for computing assembly jack locations to align parts for assembly, the system comprising:
an input interface configured to receive initial position measurement data for at least one component to be moved and information specifying a final location for the at least one component;
a computer processor operatively coupled to the input interface, the computer processor including:
a first computer processing component configured to automatically determine an initial location of the at least one component and the final location using the initial position measurement data;
a second computer processing component configured to automatically determine motion to align the at least one component with the final location;
a third computer processing component configured to automatically determine displacements of assembly jacks to produce the determined motion;
a fourth computer processing component configured to, after the at least one component has been moved according to the determined displacements, receive information indicating that a manual adjustment in addition to the determined displacements has been made to the assembly jacks; and
a fifth computer processing component configured to, after receiving the information, automatically determine a location of the at least one moved component at a final assembled position; and
a display device operatively coupled to the computer processor.

7. The system of claim 6, wherein the second computer processing component is further configured to determine a rigid motion which aligns a first reference frame determined by a plurality of points of the at least one component to be moved with a second reference frame determined by a plurality of points of the final location.

8. The system of claim 7, wherein the second computer processing component is further configured to:
move a plurality of points in design space of the at least one component to be moved to a plurality of corresponding points on the at least one component to be moved; and
move a plurality of points in design space of the final location to a plurality of corresponding points on the final location.

9. The system of claim 7, wherein the third computer processing component is further configured to apply the determined rigid motion to initial assembly jack positions at a time of measurement before moving the at least one component to be moved.

10. The system of claim 9, wherein the fifth computer processing component is further configured to subtract the initial assembly jack positions from jack positions at the final assembled position.

11. A non-transitory computer-readable medium comprising instructions executable by a processor to cause the processor to:
determine an initial location of at least one component to be moved and a final location of the at least one component to be moved using initial position measurement data for the at least one component to be moved and information specifying the final location;
determine motion to align the at least one component to be moved with the final location;
determine displacements of assembly jacks to produce the determined motion;
receive information indicating that a manual adjustment in addition to the determined displacements has been made to the assembly jacks after the at least one component has been moved; and
determine a location of the at least one moved component at a final assembled position after the information is received.

12. The non-transitory computer-readable medium product of claim 11, wherein the instructions are further executable to determine a rigid motion which aligns a first reference frame determined by a plurality of points of the at least one component to be moved with a second reference frame determined by a plurality of points of the final location.

13. The non-transitory computer-readable medium of claim 12, wherein the instructions are further executable to:
move a plurality of points in design space of the at least one component to be moved to a plurality of corresponding points on the at least one component to be moved; and
move a plurality of points in design space of the final location to a plurality of corresponding points on the final location.

14. The non-transitory computer-readable medium of claim 12, wherein the instructions are further executable to apply the determined rigid motion to initial assembly jack positions at a time of measurement before moving the at least one component to be moved.

15. The non-transitory computer-readable medium of claim 14, wherein the instructions are further executable to subtract the initial assembly jack positions from jack positions at the final assembled position.

16. A computer executable method for computing assembly jack locations to align parts for assembly, the method comprising:
automatically determining an initial location of at least one component to be moved and a final location for the at least one component to be moved using initial position measurement data for the at least one component to be moved and information specifying the final location;
automatically determining motion to align the at least one component to be moved with the final location by determining a rigid motion which aligns a first reference frame determined by a plurality of points of the at least one component to be moved with a second reference frame determined by a plurality of points of the final location;
automatically determining displacements of assembly jacks to produce the determined motion by applying the determined rigid motion to initial assembly jack positions;
after the at least one component has been moved, receiving information indicating that a manual adjustment in addition to the determined displacements has been made to the assembly jacks; and
automatically determining a location of the at least one moved component at a final assembled position by subtracting the initial assembly jack positions from jack positions after the manual adjustment has been made.

17. The method of claim 16, wherein determining a rigid motion includes:
moving a plurality of points in design space of the at least one component to be moved to a plurality of corresponding points on the at least one component to be moved; and
moving a plurality of points in design space of the final location to a plurality of corresponding points on the final location.

18. A computer executable method for computing assembly jack locations to align parts for assembly of an aircraft, the method comprising:
automatically determining an initial location of at least one aircraft component to be moved and a final location for the at least one aircraft component to be moved using initial position measurement data for the at least one aircraft component to be moved and information specifying the final location;
automatically determining motion to align the at least one aircraft component to be moved with the final location;
automatically determining displacements of assembly jacks to produce the determined motion;
after the at least one aircraft component has been moved, receiving information indicating that a manual adjustment in addition to the determined displacements has been made to the assembly jacks; and
after the information is received, automatically determining a location of the at least one moved aircraft component at a final assembled position on an assembled aircraft.

19. The method of claim 18, wherein the at least one aircraft component includes at least one component chosen from a fuselage section and a wing.

20. The method of claim 18, wherein the final location corresponds to a location of an assembly interface of a fuselage component.

* * * * *